United States Patent [19]

Petersen

[11] 4,363,603
[45] Dec. 14, 1982

[54] PUMP IMPELLER ASSEMBLY WITH ANTI-ROTATION DEVICE

[75] Inventor: Ray R. Petersen, Huntingdon Valley, Pa.

[73] Assignee: Met-Pro Corporation, Harleysville, Pa.

[21] Appl. No.: 139,891

[22] Filed: Apr. 14, 1980

[51] Int. Cl.³ .......................... F04D 29/04; F16D 1/08
[52] U.S. Cl. ............................... 416/244 R; 403/356; 403/359
[58] Field of Search .................... 416/244 R; 403/356, 403/359, 298

[56] References Cited

U.S. PATENT DOCUMENTS

| 110,510 | 12/1870 | Stedman | 403/356 |
|---|---|---|---|
| 365,263 | 6/1887 | Leib | 279/100 |
| 2,664,023 | 12/1953 | Mugford | 416/244 |
| 3,801,226 | 4/1974 | Bevan et al. | 416/244 A |
| 3,872,691 | 3/1975 | Hildebrandt | 416/244 R |
| 4,147,468 | 4/1979 | Murakami et al. | 416/244 R |

FOREIGN PATENT DOCUMENTS

| 581026 | 7/1933 | Fed. Rep. of Germany | 403/356 |
|---|---|---|---|
| 2830198 | 1/1980 | Fed. Rep. of Germany | 403/356 |
| 1374221 | 8/1964 | France | 403/359 |

*Primary Examiner*—Leonard E. Smith
*Attorney, Agent, or Firm*—Woodcock, Washburn, Kurtz, Mackiewicz & Norris

[57] ABSTRACT

Novel locking means for coupling shafts together is disclosed in which the shafts are threaded together thus axially and radially locating the first and second shafts, and are locked by means of a knurled portion encircling a first one of said shafts interacting with an internally knurled key having a peripheral shape corresponding to a removed portion of a second shaft whereby relative rotation of the shafts is provided. In a preferred embodiment, one of said shafts comprises a tubular shaft formed integrally with an impeller of a pump which may be formed of fiberglass so as to be corrosion resistant. A collar may be provided to simultaneously lock the key to the two shafts.

8 Claims, 5 Drawing Figures

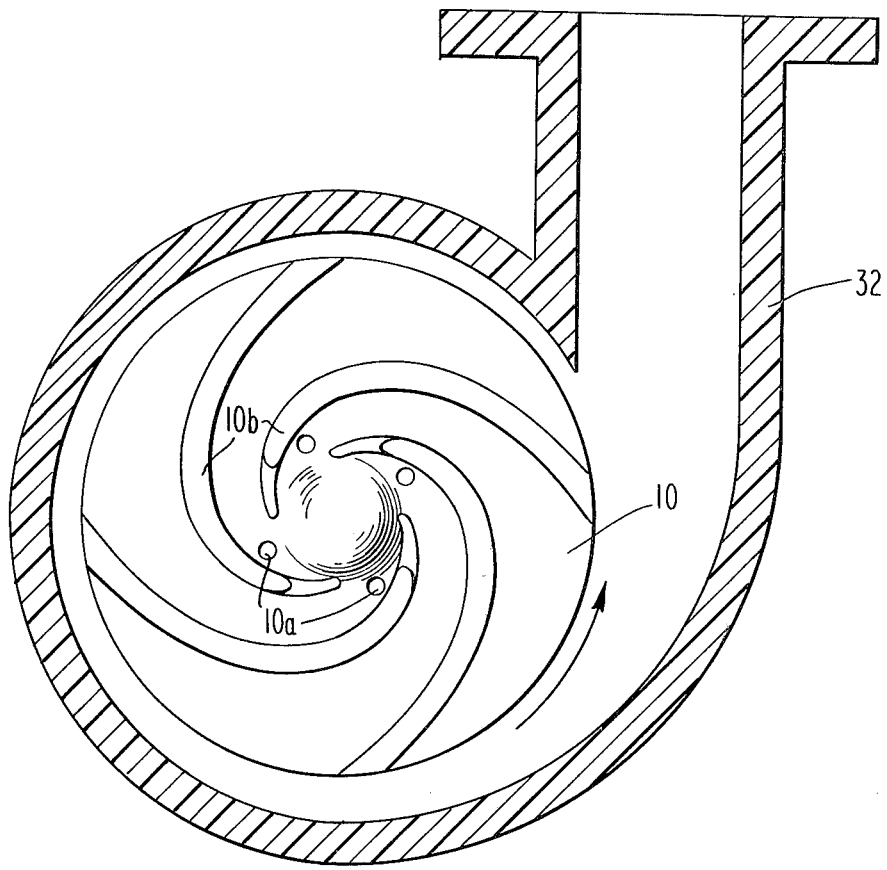
Fig. 3
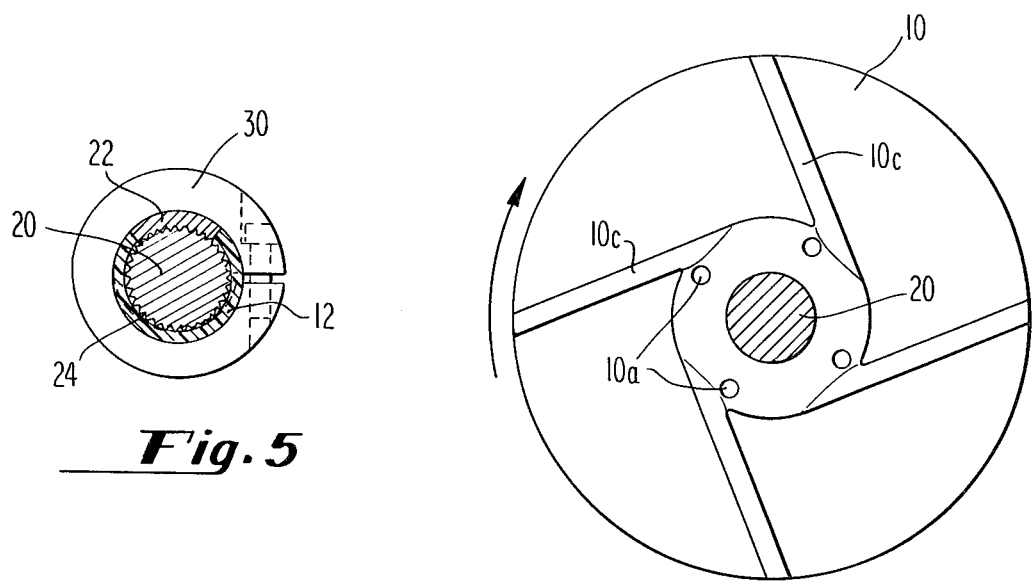
Fig. 5
Fig. 4

PUMP IMPELLER ASSEMBLY WITH ANTI-ROTATION DEVICE

FIELD OF THE INVENTION

The present invention relates to the field of locking members used to prevent threaded shaft connection means from being unscrewed. More particularly, it relates to a centrifugal pump impeller assembly which comprises a threaded connection between an impeller and its drive shaft which is prevented from coming loose or undone by a novel locking arrangement.

BACKGROUND OF THE INVENTION

With the development and expansion of the chemical industry, it has become increasingly desirable to provide equipment for the containment and transport of corrosive fluids, gases and slurries which are resistant to corrosion caused by such compounds. Particularly in the plating, primary metals, water purification, and chemical process industries it has been apparent that there is a distinct need for corrosion resistant pipe, pumps, fittings and the like. For this reason the industry has commonly used corrosion resistant but expensive materials such as "Hastelloy", tantalum and titanium alloys, stainless steels such as Type 316 and "Carpenter-20" alloy. Additionally, the industry has increasingly turned towards non-metallic materials such as plastics, specifically including fiberglass, for economic reasons, and has in some cases hybridised the two, e.g., by lining the inside of a metallic pump with a plastic material such as "Teflon".

However, in many applications it is not sufficient to simply substitute a plastic material for a metallic one, the design of the pump or other fitting otherwise remaining the same. This is because the strengths of the materials vary so greatly and in differing ways depending on the type of force exerted thereon.

A clear example of this is found in the centrifugal pump industry. Centrifugal pumps typically comprise essentially circular impellers of metallic or non-metallic materials dependent on the service conditions, having vanes on at least one surface thereof, driven by perpendicular shafts extending through the pump housing being sealed therefrom and driven by electric motors. For economic reasons it is preferable that the shaft not be made of corrosion resistant material; this requires that it be protected by a sleeve within the pump housing. Typically the electric motor is coupled to this shaft, which is supported by bearings in a bearing carrier assembly, and then threaded to the impeller which is contained within a housing of the well-known volute shape so as to provide maximum pumping efficiency.

It is possible that in the event of reverse motor connection or possibly back flow in the pipeline to which the pump is connected that the impeller might be inclined to come unthreaded from the motor shaft and back off it so as to impact the inside of the pump housing, thus causing damage to either the pump, the housing or both. A typical expedient for solving this problem in the prior metal pump art would be to lock the two together by means of, e.g., a cotter pin, a metal tab, set screw or the like. This does not eliminate the requirement of a fastener to hold the impeller fixed in the axial direction; addition of such an axial fastener, such as a nut, requires a seal between fastener and impeller to prevent corrosion of the pump shaft. Such seals, being made of imperfectly resilient materials, tend eventually to take a set and leak.

Replacement of all the metallic parts contacting the corrosive liquid or slurry to be pumped, as discussed above, involves more than a simple substitution of the desired plastic or fiberglass material for the metallic material. Each element of the pump design must be carefully considered to determine whether or not the lower strength fiberglass or plastic material will be suitable, or whether the design needs to be revised. In the case of the centrifugal pump, for example, the exterior casing forming the volute can be more or less directly transformed from metal to fiberglass and can be made by one of a number of well-known manufacturing processes. Similarly, the disk-like impeller can be molded in one piece construction from fiberglass or plastic. However, it will be appreciated by those skilled in the art that the cotter pin used to prevent unscrewing of the impeller from the motor shaft can not be so simply formed of fiberglass since the shear strength of fiberglass is very low. Nor, of course, can a simple metallic cotter pin be used because this would eventually corrode and fail to perform its function when required. Instead, new means must be found to prevent unscrewing of the impeller from the motor shaft so as to prevent the impeller from coming into contact with the interior of the pump housing and causing damage to both. Prior practices have included forming a keyway in the fiberglass impeller and mating this with a key on the motor shaft and using a second fiberglass part having a metallic nut molded therein for holding the impeller with respect to the shaft. This approach has several drawbacks. First, of course, is its complexity; it requires two fiberglass parts, where one would be more desirable, as well as a keyway. The key is still subject to corrosion and the threaded cap itself can, of course, come loose from the shaft since it cannot be held by the key.

One prior art method, shown in U.S. Pat. No. 365,263 to Leib, shows locking a threaded coupling agent unscrewing by making the mating members of similar external shape, e.g. octagonal, and proving a matching sleeve. The sleeve is then locked in axial position. However, this method is only suitable when the external surfaces happen to line up—in the octagonal case, only every 45° of relative rotation. This is clearly undesirable for reasons of versatility in assembly, as well as manufacturing cost and convenience.

Therefore, a need exists in the art for a method of holding an impeller fixed with respect to a shaft which does not require metallic coupling members and in which all threadably connected parts are positively locked against unscrewing of their threads. It would be additionally desirable, of course, if such a construction could be found which did not involve substantial additional expense in the construction of the pump and which simplified its construction.

OBJECT OF THE INVENTION

It is therefore an object of the invention to provide an improved pump.

Another object of the invention is to provide an improved pump of a type in which the fluid or slurry to be pumped is contacted only by corrosion resistant materials such as fiberglass.

A further object of the invention is to provide such a pump in which the impeller, while being threadably connected to the motor shaft, is prevented from becoming unscrewed from the motor shaft by means not subject to corrosion.

Still a further object of the invention is to provide a fiberglass pump which can be readily and economically made yet in which contact between the impeller and pump housing is prevented from locking the impeller to the motor shaft.

SUMMARY OF THE INVENTION

The above object of the invention and needs of the art are satisfied by the present design in which the impeller is formed integrally with a tubular shaft so sized that the pump shaft can fit therein. The impeller is formed with an integral metallic threaded insert for mating with the pump shaft. When the impeller is threaded onto the pump shaft it is axially located with respect to the pump shaft by the threading together of the insert and the shaft. A cut-out portion is provided on the tubular impeller shaft at a distance from the impeller such that it exposes a portion of a knurled section of the pump shaft. An internally knurled semi-cylindrical key corresponding in external shape to the cut-out portion of the tubular shaft and having a knurled interior surface to mate with the knurled portion of the pump shaft is provided and is locked in place by a collar. In this way the knurled section prevents rotation of the impeller with respect to the pump shaft and consequent unscrewing of the impeller therefrom. Thus the threaded connection can become tight at any relative radial position of impeller and shaft, while still permitting the knurled or splined key to be used. This is in distinction to the methods of the prior art in which a specific radial location of sleeve and shaft is essential in order that a key, set screw, cotter or split pin or the like can be used.

BRIEF DESCRIPTION OF THE DRAWING

The invention will be better understood if reference is made to the accompanying drawing in which:

FIG. 3 shows a cross-sectional view along the line 3—3 of FIG. 2 showing one face of the pump;

FIG. 4 shows the other side of the impeller, taken along the line 4—4 of FIG. 2; and FIG. 5 shows a cross-section taken along the line 5—5 of FIG. 2 which shows the knurled locking arrangement used.

DESCRIPTION OF THE PREFERRED EMBODIMENT

As discussed above, the invention relates to means for locking an impeller to a shaft in such a way that despite counter-rotation of the impeller it does not tend to become unthreaded from the shaft which tends to cause damage to the impeller, the housing within which it is contained or both. Moreover, the invention relates primarily to impellers made of materials which are chosen for their corrosion resistance such as plastics or fiberglass and which can not be secured to a shaft by the typical metallic cotter pin, set screw or other such means because of their lack of corrosion resistance, without the use of additional seals or gaskets. Nor can plastic pins be substituted, since such would lack shear or tensile strength. However, the novel coupling method disclosed has applicability beyond couplings of such materials.

Figure 1:
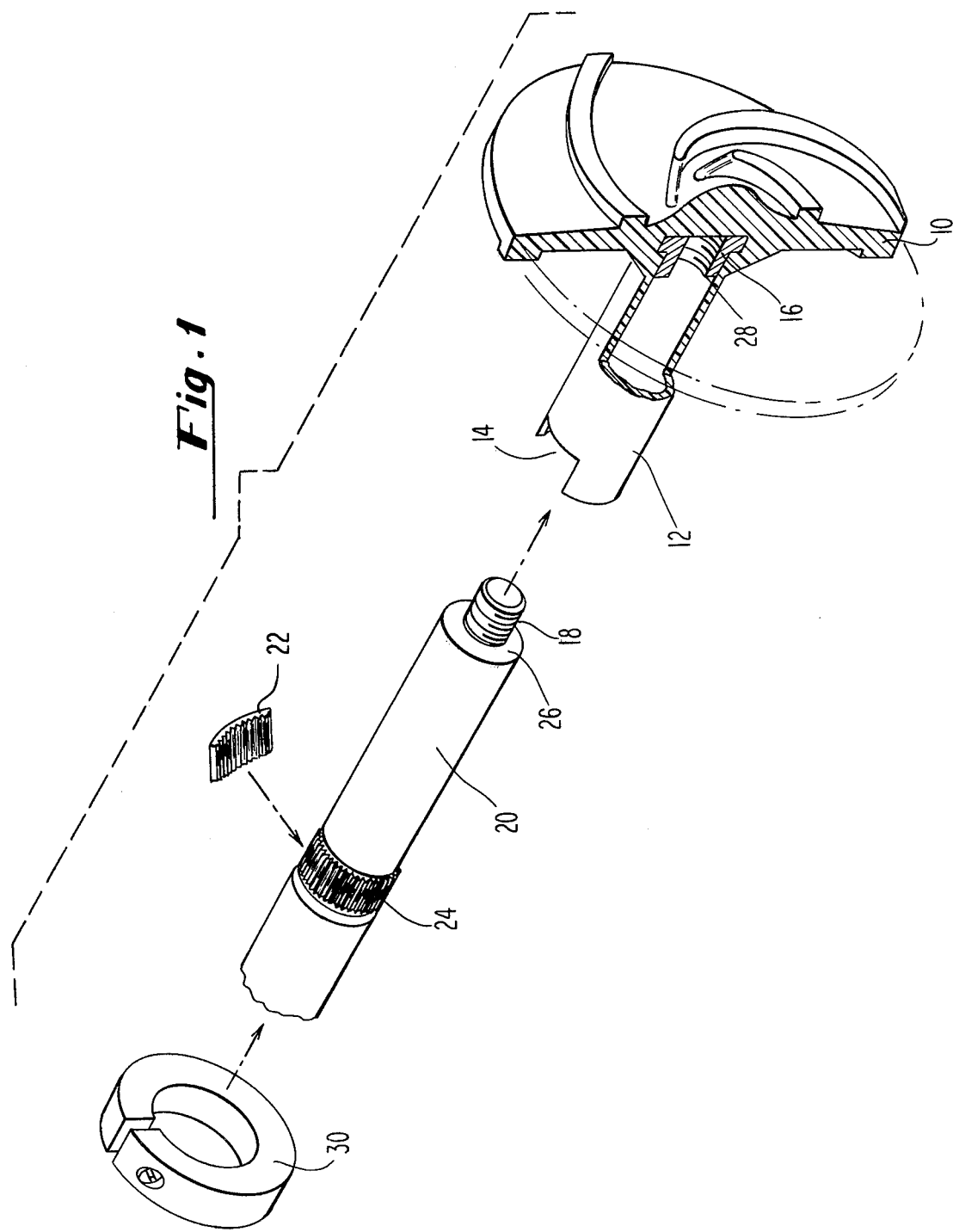
FIG. 1 shows an overall exploded view of the impeller, drive shaft, locking key and a ring used to secure the key.

Referring now to FIG. 1 an overall exploded view of the coupling scheme of the invention is shown. In the preferred embodiment an impeller 10, which may be formed of fiberglass or other plastic materials, is integrally molded so as to comprise a tubular shaft 12 provided with a cut-out section 14. A metallic insert 16 is preferably molded into the fiberglass impeller 10 so that the threaded portion 18 of a motor connecting shaft 20 can be threaded firmly thereto without the necessity of forming threads in the fiberglass, which both complicates the mold process and is difficult to accurately implement. The impeller 10 may be formed by one of a number of well-known processes. In the presently preferred embodiment the process chosen is that known as "resin injection" in which a blanket of fibers is placed into a mold, the mold then being closed and resin pumped, under low pressure, into the mold, thus eliminating the requirement of fillers for the fiberglass and contributing to the strength of the assembly.

As mentioned above the impeller 10 is molded integrally with the shaft 12, of generally tubular shape. A section 14 of the wall of this tube is removed; this section 14 is adapted to mate with a semi-cylindrical key 22 having a knurled inner surface which is adapted to mate with a knurled portion 24 on the motor shaft 20. The knurl may be a standard coarse knurl. Thus, in assembly, the threaded portion 18 of the shaft 20 mates with the threaded insert 16 molded into the impeller 10. This threaded connection is tightened down until the shoulder 26 of the shaft 20 abuts the corresponding shoulder 28 of the threaded insert 16. Thus, both the radial and axial positions of the impeller with respect to the shaft are fixed by the threaded connection and not by the locking means. The locking means is adapted to lock the impeller to the shaft at any relative radial position. This is in distinction to all methods known to applicant to be in the prior art in which a cotter pin, key, set screw or the like was always used and which require a particular radial orientation of the impeller with respect to the shaft in order to obtain locking of a threaded connection. This offers, as discussed above, the serious drawback that if, e.g., the two parts are assembled the first time and drilled for a pin, thus fixing their radial positions, not only does this weaken the shaft, but it does not allow any later change to be made in the radial position. For example, if the threads should wear or stretch slightly, the preferred radial position would then change so that the threads could be tight, but the hole having been drilled, prevents changing of the radial orientation.

While the approach shown in the Leib patent referred to above eliminates drilling, Leib's octagonal shaft permits relative positioning increments of 45°—far too great to cope with, e.g. thread stretch.

According to the present invention, however, once the threaded connection has established a particular relative radial position of impeller and shaft, the mating knurled key 22, which has a peripheral shape adapted to mate with a cut-out 14 of the tubular shaft 12, is inserted, thus locking the impeller 10 with respect to the shaft 20. A collar 30 may be provided to retain the knurled key 22 in engagement with the knurled section 24 of the shaft and the cut-out 14 of the tubular impeller shaft. In this way the impeller can be locked with respect to the shaft at substantially any radial position, which can therefore be established by simply tightening the threads 16 and 18 together until the shoulders 26 and 28 abut. The fineness of the knurl is the only limitation on the increments of position possible. It is found that a standard coarse knurl is sufficiently fine to allow substantially unlimited freedom of positioning.

Figure 2:
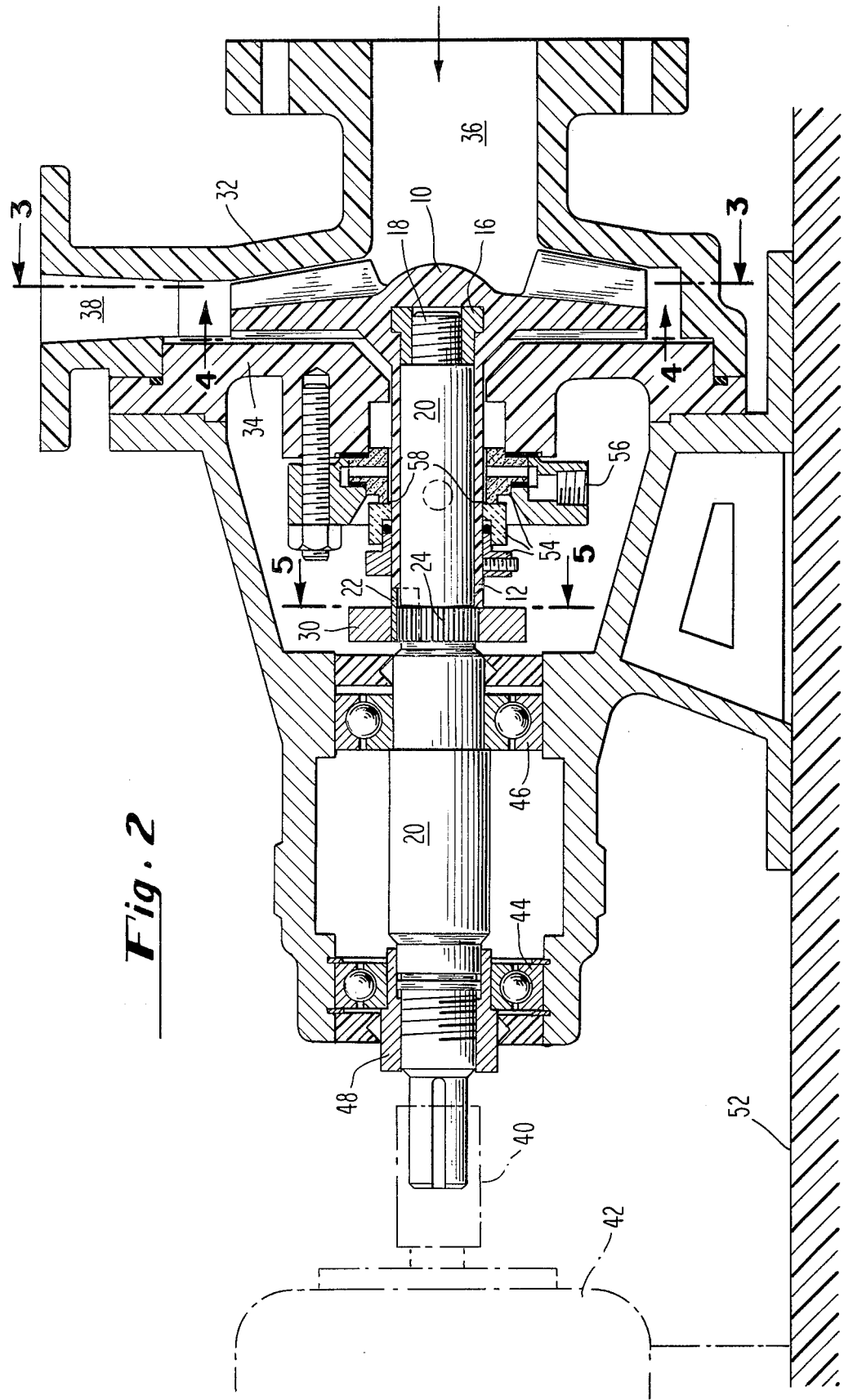
FIG. 2 shows a cross-sectional view of a centrifugal pump, using a shaft connection according to the invention, mounted on a bearing carrier.

Referring now to FIG. 2, the overall construction of the pump having a shaft coupling according to the invention is shown. The pump may, in a preferred embodiment in which all parts contacting the corrosive fluid or slurry with which it is designed to be used, be made of a plastics material such as fiberglass. The pump comprises an impeller 10, described above in connection with FIG. 1, riding within a pump housing comprised of a first and second housing members 32 and 34, both also made of fiberglass. These may be provided with flanges, bore holes and the like in standard patterns to provide ready connection of the inlet port 36 and the outlet port 38 to other parts of the system within which the pump of the invention is used. The impeller 10 may comprise a conventional centrifugal pump or other well-known prior art design. Rotational power is transmitted to the impeller by means of a shaft 20 connected by means of a coupling 40, shown in phantom, to a motor 42, also shown in phantom. In a particularly preferred embodiment, the shaft 20 is carried by means of bearings 44 and 46 in a castiron housing 50; both motor 40 and housing 50 are shown carried on a common base 52 which may preferably also be made of fiberglass for corrosion resistance. The housing 50 may also comprise means indicated generally at 48 for adjustment of the clearance between the impeller 10 and the pump housing 32, 34. Seals are provided to prevent the corrosive liquid from attacking the bearings 44 and 46. These may comprise conventional ceramic/carbon seals indicated generally at 54 which are well-known prior art expedients. In a particularly preferred embodiment, the seal area is provided with water, piped in at a port 56 which provides constant lubrication to the seal and continually washes the sealing face 58, which aids in extending the seal lifetime considerably. As discussed above in connection with FIG. 1, the impeller comprises an integrally molded tubular shaft section 12 having a removed portion adapted to mate with a semi-cylindrical internally knurled key 22 which mates in turn with a knurled section 24 of the shaft 20 and which is held in place by a collar 30. It will be appreciated by those skilled in the art that this collar 30 is in the position ordinarily occupied by the slinger which is used to prevent any slurry from impacting upon the bearings 46 and destroying them and that, therefore, the provision of the locking assembly according to the invention does not take up any additional space within the bearing carrier housing 50.

Referring now to FIG. 3, a cross-section taken along the line 3—3 of FIG. 2, it will be observed how the impeller 10 fits within the housing 32 which is molded so as to form a volute thus providing efficient pumping action upon rotation of the impeller 10 in the direction indicated by the arrow. Balance holes 10a to prevent cavitation and spiraling vanes 10b are provided in a manner well-known in the art.

FIG. 4, is a view taken along the line 4—4 of FIG. 2, shows the reverse side of the impeller 10 from that depicted in FIG. 3 and shows the plurality of straight vanes 10c and the other side of the balance holes 10a, again in accordance with the teachings of the prior art.

Finally, FIG. 5 shows details of the connection. There the key 22 is shown fitting into the knurled area 24 of the shaft 20 and into the area removed from the integrally molded tubular shaft 12 of the impeller 10 thus locking it with respect to the shaft 20 without the necessity of providing a cotter pin, expansion pin, set screw, key or the like. The collar 30 may be provided to hold the knurled key 22 in place and the collar 30 may be a one-piece, slightly expansible collar, held together by a screw shown in phantom, or might comprise a two piece collar that could be readily assembled and removed from the shaft when it was desired to remove the impeller for reasons of maintenance, replacement, repair or the like.

It will be appreciated that there are numerous modifications and improvements which can be made to the invention without departing from its essential scope. For example, while it has been described in conjunction with fiberglass pumps for the pumping of corrosive liquids or slurries inasmuch as that is the particular application presently envisioned, it will be appreciated that the invention is useful in connection with many shaft joining applications. Moreover, it will be understood that while the key and the section of the shaft which the key is designed to interact with have been described as "knurled", and the interaction shown is one of interdigitation, these terms are to be construed to include any form of positive connection which will serve to lock the tubular shaft at any given position with respect to the solid shaft by interaction of an insert with a removed section of the tubular shaft and with a section of the solid shaft. Clearly, for example, the knurled section could be formed on the inner surface of the locking ring 30 itself though for manufacturing reasons this is not a preferred embodiment. Too, more than one removed section could be provided if this were deemed desirable. Further, the pump shaft could be tubular, and the integral impeller shaft solid. The essence of the invention is that the locking means be useful irrespective of the relative radial position of the two shafts which can therefore be determined by other means, such as in the preferred embodiment, where the relative radial position of the shafts is fixed by the point at which the shoulders 26 and 28 of the respective threaded members engage one another. Flexibility in manufacture and assembly is thus provided in conjunction with positive means for preventing the unscrewing of a threaded connection between shafts.

It will therefore be understood that while a preferred embodiment of the invention has been shown and described, this is not to be taken as a limitation on its scope which is more properly described by the following claims.

I claim:

1. In a pump construction of the type in which a rotatable impeller means is threaded onto a driving shaft means, the improvement which comprises providing said impeller means with integral tubular means for mating with said driving shaft, said tubular means having a portion of predetermined shape removed therefrom, providing said driving shaft with radially symmetric locking means and providing means interacting with said removed portion and said radially symmetric locking means whereby said impeller means is fixed with respect to said shaft, said means interacting with said portion comprising a portion of a cylinder of the same radius as said tubular portion of said impeller and having means on the internal surface thereof interacting with means on the surface of said driving shaft for locking said impeller means to said driving shaft means.

2. The construction of claim 1 in which the interaction between said locking means and said shaft means is by interdigitation of regular tooth means.

3. The construction of claim 2 in which said tooth means are knurled teeth.

4. Apparatus for locking first and second threadedly connected shaft members together, comprising radially symmetric locking means on said first shaft, radially asymmetric locking means on said second shaft, and means coupling said symmetric and said asymmetric locking means together, wherein said radially asymmetric means on said second shaft comprises a portion being removed from said second shaft, said locking means having an external shape corresponding to said removed portion, whereby said first and second shafts may be locked together.

5. The apparatus of claim 4 wherein said means coupling said symmetric and said asymmetric locking means together comprises key means having a first locking surface for interacting with any portion of said symmetric locking means and second locking means for interacting with said asymmetric means on said second shaft.

6. The apparatus of claim 4 wherein said radially symmetric locking means comprises regular toothed means formed on the surface of said first shaft and the locking surface on said locking member for mating with said symmetric locking means on said first shaft comprises teeth corresponding to those formed on the surface of said first shaft.

7. The apparatus of claim 4 further comprising collar means for holding said locking means in place with respect to said first and second shafts.

8. The apparatus of claim 4 wherein said locking means and at least one of said shafts are formed of plastic material.

* * * * *